US008908839B2

(12) United States Patent
Yasrebi et al.

(10) Patent No.: US 8,908,839 B2
(45) Date of Patent: Dec. 9, 2014

(54) FLAGGED MESSAGES IN AN AUTOMATIC INTEGRATED UNIFIED MESSAGING ESCALATION SYSTEM

(71) Applicant: AT&T Intellectual Property I, L.P., Atlanta, GA (US)

(72) Inventors: Mehrad Yasrebi, Austin, TX (US); James Jackson, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/847,872

(22) Filed: Mar. 20, 2013

(65) Prior Publication Data
US 2013/0246544 A1 Sep. 19, 2013

Related U.S. Application Data

(63) Continuation of application No. 12/582,441, filed on Oct. 20, 2009, now Pat. No. 8,428,229.

(51) Int. Cl.
H04M 1/64 (2006.01)
H04L 12/58 (2006.01)
G06F 15/16 (2006.01)
H04M 3/53 (2006.01)
H04M 3/51 (2006.01)

(52) U.S. Cl.
CPC .............. *H04L 51/36* (2013.01); *H04M 3/53* (2013.01); *H04M 2203/4509* (2013.01); *H04M 3/51* (2013.01); *H04L 51/34* (2013.01); *H04L 12/5885* (2013.01); *H04L 12/589* (2013.01)
USPC ................ 379/88.22; 455/412.1; 709/206

(58) Field of Classification Search
USPC .............. 379/88.13–88.23, 88.25; 455/412.1; 709/206
See application file for complete search history.

(56) References Cited

U.S. PATENT DOCUMENTS

| 5,287,498 | A | 2/1994 | Perelman et al. |
| 5,966,351 | A | 10/1999 | Carleton et al. |
| 6,633,630 | B1 | 10/2003 | Owens et al. |
| 7,212,617 | B2 | 5/2007 | Owens et al. |
| 2006/0010210 | A1 | 1/2006 | Keller |
| 2006/0177021 | A1 | 8/2006 | Delaney et al. |
| 2007/0177717 | A1 | 8/2007 | Owens et al. |
| 2008/0293385 | A1 | 11/2008 | Helferich |
| 2009/0129567 | A1 | 5/2009 | Jackson et al. |
| 2009/0132662 | A1 | 5/2009 | Sheridan et al. |
| 2009/0156171 | A1 | 6/2009 | Yasrebi et al. |
| 2009/0180597 | A1 | 7/2009 | Jackson et al. |
| 2010/0153455 | A1 | 6/2010 | Yasrebi et al. |
| 2011/0091028 | A1 | 4/2011 | Yasrebi et al. |
| 2011/0093544 | A1 | 4/2011 | Yasrebi et al. |
| 2011/0126126 | A1 | 5/2011 | Blair |

OTHER PUBLICATIONS

U.S. Appl. No. 12/334,968, filed Dec. 15, 2008, entitled "Method and System for Automatically Defining Organizational Data in Unified Messaging Systems".
U.S. Appl. No. 12/123,996, filed May 20, 2008, entitled "System and Method of Controlling a Messaging System".

*Primary Examiner* — Mohammad Islam
(74) *Attorney, Agent, or Firm* — Wolff & Samson, PC

(57) ABSTRACT

An automatic message escalation system includes attaching an acknowledgement flag to a message after it is received in the message mailbox of an identified message recipient. The status of the acknowledgement flag indicates whether or not the message has been retrieved. After a given or specified period of time, the acknowledgement flag is checked to see if the message was retrieved. If the message was retrieved, the message will not be escalated. If the message was not retrieved, the message will be sent to the next message recipient on an escalation list.

20 Claims, 7 Drawing Sheets

FLAGGED MESSAGES IN AN AUTOMATIC INTEGRATED UNIFIED MESSAGING ESCALATION SYSTEM

This application is a continuation of prior Application Ser. No. 12/582,441, filed Oct. 20, 2009, which is hereby incorporated by reference.

BACKGROUND

The disclosed technology relates generally to message routing and more particularly to automatic escalation in a unified messaging platform environment.

Unified messaging is the integration of different forms of communication (e.g., email, voicemail, short message service (SMS), fax, etc.) into a single, unified message store (e.g., a unified messaging platform) accessible from a variety of user devices.

Call centers are an exemplary application of unified messaging. Call centers are centralized offices used for the purpose of receiving and transmitting large volumes of requests by telephone or other communication devices. Call centers are used to receive incoming calls to an organization (e.g., a company, corporation, business unit, etc.). For example, call centers may be used as a customer service center staffed by multiple customer service representatives (CSRs). A customer service representative is also equivalently referred to as an employee herein. Each representative may be responsible for one or more customer accounts and/or types of customer issues (e.g., account termination, maintenance, billing disputes, etc.).

However, a call center is generally associated with a single telephone number or a limited number of telephone numbers. That is, an organization may have a single customer service number (e.g., 1-800-CUSTOMR) that all customers call, regardless of the reason for calling. Incoming calls are then routed based on operator routing, hierarchical customer service representative response, automated speech recognition systems, or the like. If a particular customer service representative responsible for the incoming call is unavailable, the customer may be invited to leave a message in the form of a voicemail.

In a unified messaging platform environment, other communications methods, such as email and facsimiles, may also be used to contact customer service representatives. In call centers using a single or limited incoming telephone numbers, these emails and facsimiles may be deposited along with the voicemails as described above. Customers who have left messages for a particular customer service representative may experience poor quality of service when the customer service representative is unavailable for a significant period or if the customer's needs are urgent. That is, the customer may not receive a timely response to their message because the message has not been received by any customer service representative.

BRIEF SUMMARY

The automatic message escalation system of the disclosed technology includes attaching an acknowledgement flag to a message after it is received in the message mailbox of an identified message recipient. The status of the acknowledgement flag indicates whether or not the message has been retrieved. After a given or specified period of time, the acknowledgement flag is checked to see if the message was retrieved. If the message was retrieved, the message will not be escalated. If the message was not retrieved, one or more escalation notification messages will be sent to other CSR recipients based on configured escalation schedules and recipient sets. The configured notification schedule and escalation data can have termination parameters. The message may be maintained in the mailbox of the original recipient, and various authorized CSR recipients may be able to access the message and change the status information of a message, depending on the escalation policies and the status of the acknowledgement flag. The escalation data for each recipient can span various levels of the organization.

After the message is escalated, the escalation system will continue to perform status checks on the message until the acknowledgement flag is marked as retrieved or the escalation parameters have reached the highest contact on the hierarchy model. The acknowledgement flag and other status information about a received message can be changed by authorized CSRs.

Additionally, if an escalation recipient opens a message and decides they were the unintended recipient of that message or cannot handle the message properly, the recipient may reset the acknowledgement flag. In this case, the system will continue to perform status checks on the message and escalate the message as defined by the escalation parameters. A CSR recipient of an original message from a customer can receive one or more initial notification messages, after the unified messaging platform deposits a customer message into his/her mailbox.

DETAILED DESCRIPTION

Figure 1:
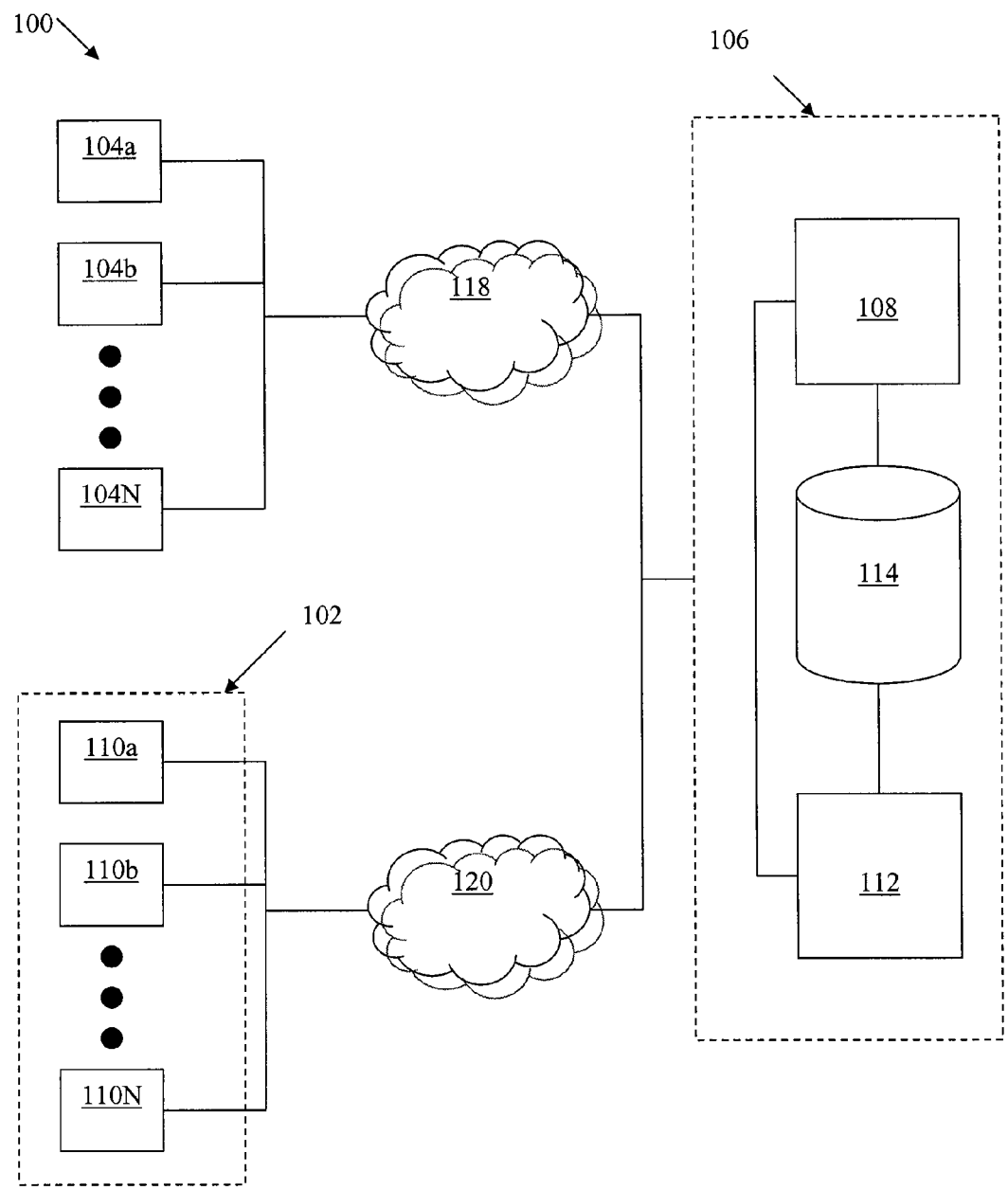
FIG. 1 depicts a unified messaging system according to an embodiment of the disclosed technology.

FIG. 1 depicts a calling system 100 according to an embodiment of the present disclosure. Calling system 100, which may be used in unified messaging (UM), includes an exemplary call center 102 in communication with one or more customers 104a, 104b, . . . , 104N and a UM platform 106.

Call center 102 includes one or more customer service representatives 110a, 110b, . . . , 110N. In at least one embodiment, customers 104a-N are connected to, and/or are in communication with call center 102 and one or more customer service representatives 110a-N using communication network 108 and/or communication network 120.

Customer service representatives (CSRs) 110a-N are in communication with UM platform 106, which includes UM interface 108, UM controller 112, and/or UM database 114. Communication between UM interface 108 and customer service representatives 110a-N may be controlled by a UM controller 112. UM controller 112 and/or UM interface 108 may also control and/or be in communication with UM database 114. As described herein, "in communication with" describes connection between components (e.g., customers 104a-N, UM interface 108, customer service representatives 110a-N, UM controller 112, UM database 114, etc.) that can transmit signals and/or information to each other using any appropriate protocol and combination of wired and/or wireless communication techniques (e.g., VOIP, wired, IP, etc.). In at least one embodiment, such communication may be through and/or with a telephone and/or packet network, as is known. For example, in some embodiments, CSRs 110a-N may communicate with (e.g., access) the UM platform 106 and their messages using telephone user interface (TUI) and/or one or more computer programs. Originators of voice or video calls that are not answered by any customer service representative 110a-N may choose to leave messages into the UM database 114 of the UM platform 106, as mediated by the UM interface 108 and UM controller 112. Other message types (for example, e-mail and facsimile messages) that may be addressed to the common customer service representatives 110a-N may also be deposited into the UM database 114 as managed by the UM controller 112 and/or UM interface 108.

Call center 102 and/or UM platform 106 may be constructed using any appropriate combination of physical components and special-purpose computers configured to carry out the specific functions described below. Additionally, various components of UM platform 106 may be combined and/or may have functionality split over various components. For example, UM interface 108 may include a database configured as UM database 114 and a controller configured as UM controller 112. In another example, UM controller 112 may be implemented in a program executed at a remote server that controls and routes calls and messages to UM interface 108 and/or customer service representatives 110a-N.

Customers 104a-N are users of the call center 102 using any appropriate communications device (e.g., telecommunications device, telephone, mobile telephone, email-capable device, facsimile machine, etc.) to communicate with call center 102 and/or customer service representatives 110a-N. UM platform 106 is based on a unified messaging system. As such, UM platform 106 supports voice, email, and facsimile message types in a unified fashion. For example, subscribers to (e.g., users of) UM platform 106, such as customer service representatives 110a-N of call center 102, may receive and deposit messages of any type in an associated mailbox or associate mailboxes of the UM platform 106. In this way, UM platform 106 is accessed via one or more networks (e.g., telephone, packet, etc.) to receive and handle messages based on incoming data. The UM platform may also initiate transmission of messages such as reminder messages. The designation N is used only to indicate multiplicity of numbers, and the number of customers 104a-N may be different than the number of customer service representatives 110a-N.

UM interface 108 is any appropriate server or server-like device or devices that can receive information from customers 104a-N and can send information to and receive information from customer service representatives 110a-N and customers 104a-N. That is, UM interface 108 coordinates (e.g., receives and/or stores) communications from customers 104a-N who wish to access the call center 102 and customer service representatives 110a-N. In at least one embodiment, UM interface 108 includes a telephone user interface (TUI) program. In another embodiment, UM interface 108 may also include the communication capability to offer its users support for multimedia communication sessions to store video messages. UM interface 108 may be implemented as a computer, such as the computer 200 discussed below with respect to FIG. 2. That is, UM interface 108 may include and/or be a computer adapted to perform the methods described below with respect to FIGS. 4, 5 and 6. As described above, UM interface 108 may be coupled to or include UM controller 112 and/or UM database 114.

Customer service representatives 110a-N are local and/or remotely connected representatives of an organization (e.g., customer care representatives, call center support staff, etc.) using any appropriate communications device (e.g., telecommunications device, computer with communication software/firmware, telephone, mobile telephone, email-capable device, facsimile machine, etc.) to communicate with call center 102 and/or customers 104a-N.

UM controller 112 is any appropriate module that can send information to and receive information from UM interface 108, customers 104a-N, and customer service representatives 110a-N. That is, UM controller 112 coordinates communications between UM interface 108 and customer service representatives 110a-N in accordance with the methods described herein. In at least one embodiment, UM interface 108 may implement an application programming interface (API). In another embodiment, UM controller 112 may handle processing of messages such as recorded voice and/or vide calls, e-mails and facsimiles. In an alternative embodiment, UM controller 112 is a remote web server or similar device capable of performing the functions described below. In either embodiment, UM controller 112 may be implemented as a computer, such as the computer 200 discussed below with respect to FIG. 2. That is, UM controller 112 may include and/or be a computer adapted to perform the methods described below with respect to FIGS. 4, 5 and 6.

Figure 3A:
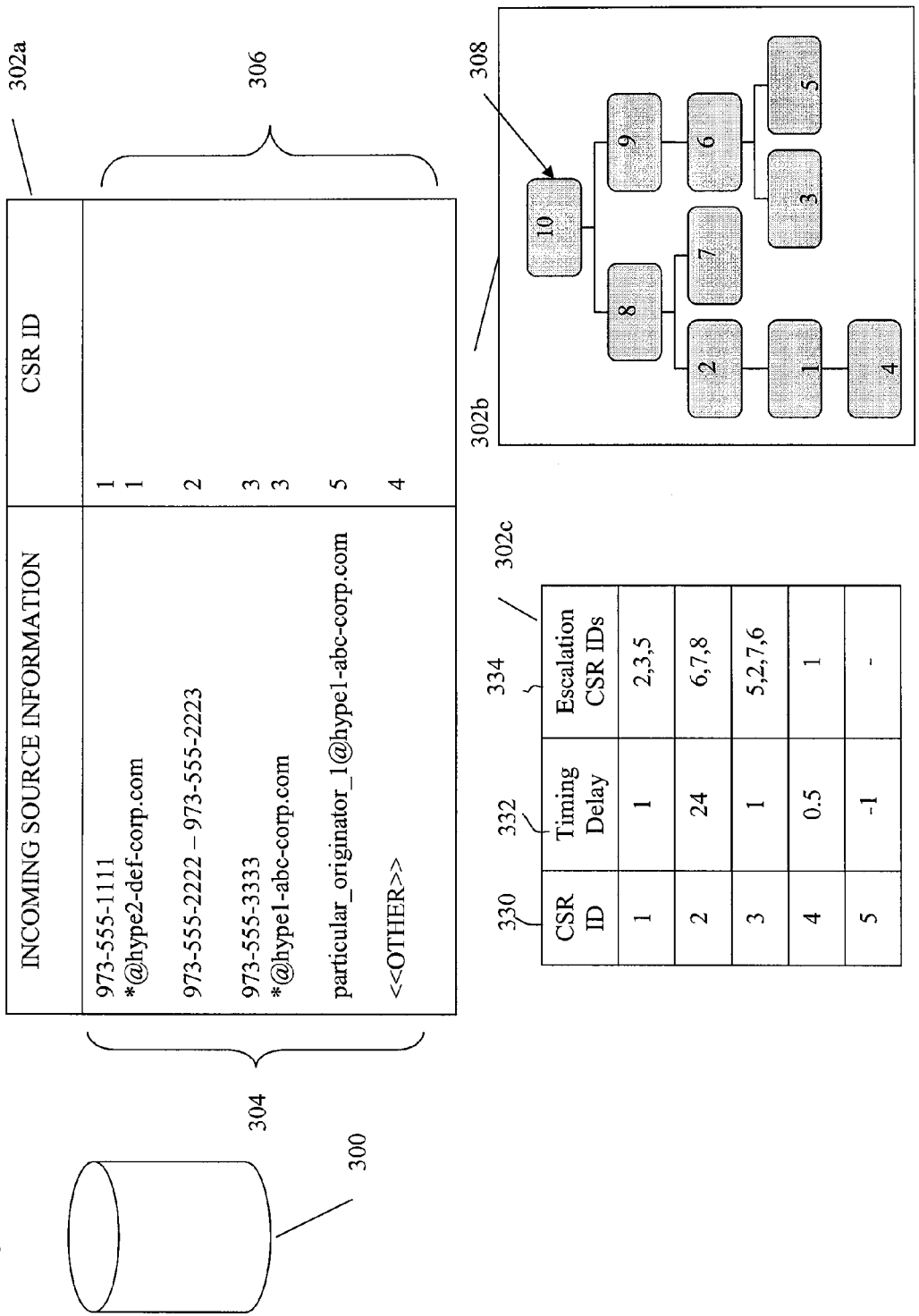
FIGS. 3a and 3b (collectively, referred to as FIG. 3) depict a database according to an embodiment of the disclosed technology.
Figure 3B:
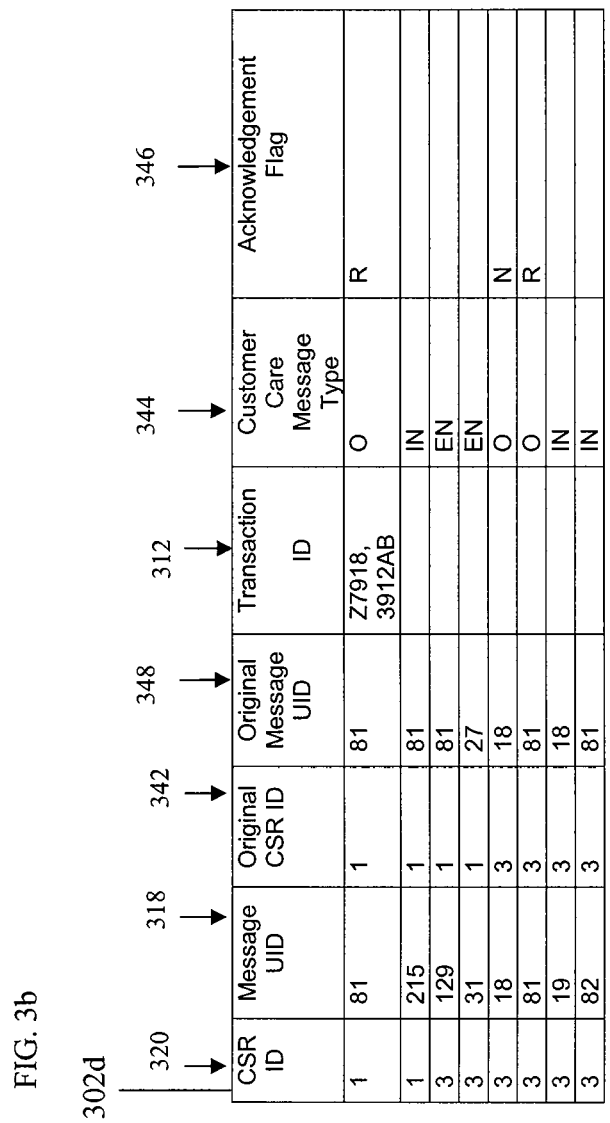

UM database 114 is any appropriate database, such as the database described below with respect to FIGS. 3a and 3b. In at least one embodiment, UM database 114 is a database that can contain data to correlate information (e.g., invoice number, telephone number, trouble ticket, etc.) related to customers 104a-N with an associated customer service representative 110a-N. The database 300 described below with respect to FIGS. 3a and 3b is an example of the correlations and/or associations that may be used to implement the methods described below with respect to FIGS. 4, 5 and 6. Portions of database 114 may be associated with or related to or used with one or more address books (not shown) of call center 102.

Communications to and/from UM platform 106 and customer service representatives 110a-N and customers 104a-N may be through the analog communication network 118 (e.g., one or more telephone networks) and/or packet communication network 120 (e.g., a private local area network, a private wide area network and/or the public network known as the Internet). The interface components of UM platform 106 to the analog communication network 118 and packet communication network 120 are not shown, but may be implemented as part of UM interface 108 in at least one embodiment. In at least one embodiment, email messages and multimedia (e.g., voice and/or data) can be transmitted through the packet communication network 120, and facsimile messages can be transmitted through the analog communication network 118 and/or packet communication network 120. Various communications components and network connections are not shown in FIG. 1, and are apparent to persons skilled in the art. Communication network 118 and communication network 120 may be implemented using any past, present and future protocols and such technologies would not be excluded from the scope of this present disclosure. For example, communication network 120 may be implemented using one or more protocols such as GSM, wimax, 802.11a, 802.11g, 802.11n, 802.3 Ethernet, leased lines, and other technologies. Communication network 118 and communication network 120 may each consist of one or more networks. For example, communication network 120 may include a GSM network for wireless communications to and from one or more customers 104a-N, one or more wired connections to one or more customers 104a-N, and have one or more wired connections to call center 102 and the customer service representatives 110a-N. Detailed components, such as possible additional networks and components associated with call center 102 and customers 104a-N are not shown.

Figure 2:
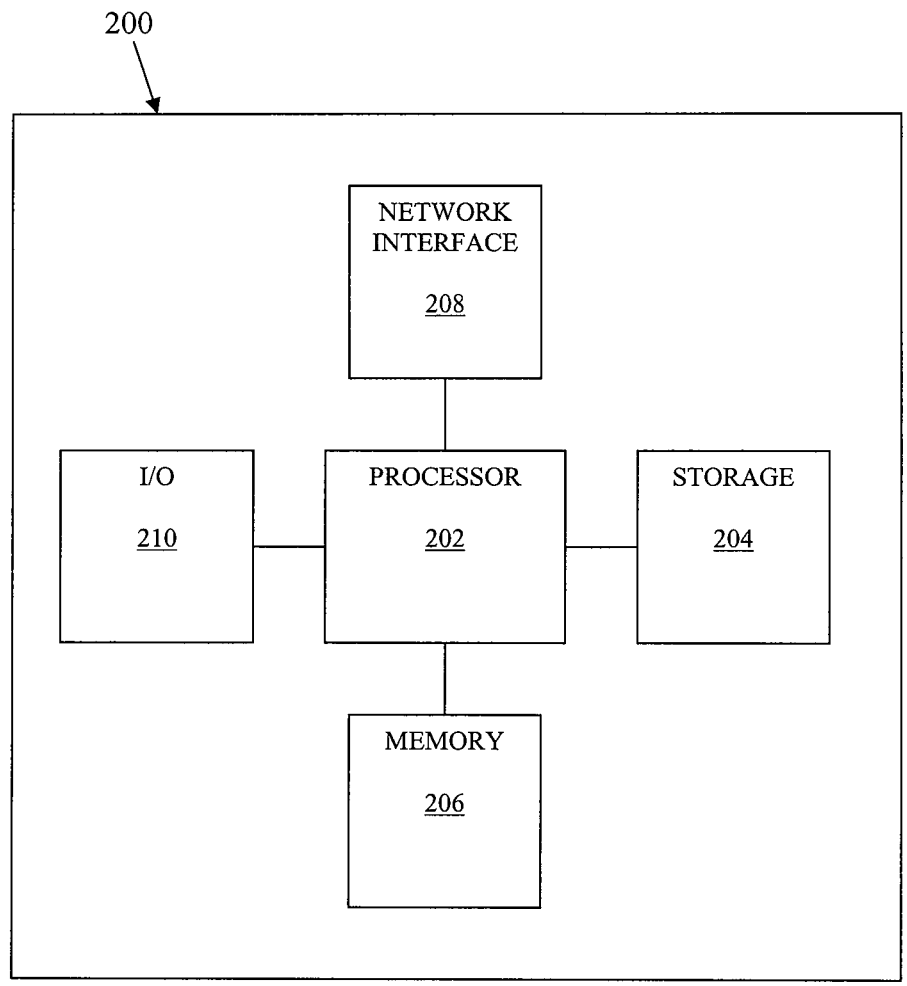
FIG. 2 is a schematic drawing of a computer.

FIG. 2 is a schematic drawing of a computer 200 according to an embodiment of the present disclosure.

Computer 200 contains devices that form a controller including a processor 202 that controls the overall operation of the computer 200 by executing computer program instructions, which define such operation. The computer program instructions may be stored in a storage device 204 (e.g., magnetic disk, database, etc.) and loaded into memory 206 when execution of the computer program instructions is desired. Thus, applications for performing the herein-described method steps, such as those described below with respect to method 400 are defined by the computer program instructions stored in the memory 206 and/or storage 204 and controlled by the processor 202 executing the computer program instructions. The computer 200 may also include one or more network interfaces 208 for communicating with other devices via a network. The computer 200 also includes input/output devices 210 that enable operator interaction with the computer 200. Computer 200 and/or processor 202 may include one or more central processing units, read only memory (ROM) devices and/or random access memory (RAM) devices. One skilled in the art will recognize that an implementation of an actual computer could contain other components as well, and that the computer of FIG. 2 is a high level representation of some of the components of such a computer for illustrative purposes.

According to some embodiments of the present disclosure, instructions of a program (e.g., controller software) may be read into memory 206, such as from a ROM device to a RAM device or from a LAN adapter to a RAM device. Execution of sequences of the instructions in the program may cause the computer 200 to perform one or more of the method steps described herein. In alternative embodiments, hard-wired circuitry or integrated circuits may be used in place of, or in combination with, software instructions for implementation of the processes of the present disclosure. Thus, embodiments of the present disclosure are not limited to any specific combination of hardware, firmware, and/or software. The memory 206 may store the software for the computer 200, which may be adapted to execute the software program and thereby operate in accordance with the present disclosure and particularly in accordance with the methods described in detail below. However, it would be understood by one of ordinary skill in the art that the present disclosure as described herein could be implemented in many different ways using a wide range of programming techniques as well as general purpose hardware sub-systems or dedicated controllers.

Such programs may be stored in a compressed, uncompiled, and/or encrypted format. The programs furthermore may include program elements that may be generally useful, such as an operating system, a database management system, and device drivers for allowing the portable communication device to interface with peripheral devices and other equipment/components. Appropriate general purpose program elements are known to those skilled in the art, and need not be described in detail herein.

FIGS. 3a and 3b depict a database 300 according to an embodiment of the present disclosure. In at least one embodiment, database 300 is used as UM database 114 of FIG. 1. In an exemplary embodiment, database 300 includes one or more tables 302a, 302b, 302c and 302d. Tables 302a-c may include a list of incoming source information 304 (e.g., telephone numbers (TNs), email addresses, email domains, etc. associated with calling customers 104a-N, email addresses, etc.), an associated transaction identification number (transaction ID) 306 (e.g., invoice number, trouble ticket, etc.), an organizational chart 308, a hierarchical structure, a message response timing indication list (e.g., a list indicating a time until action if a message has not been acknowledged by a customer service representative, etc.), explicit lists of identifications for zero or more CSRs for escalation purposes or any other appropriate list or structure. Database 300 may include other information (not shown) such as some data that may be used in the general operations of unified messaging platforms. Database 300 may be a flexible mapping database and may be configured (e.g., by a user of the call center 102).

Database 300 may be collection of data that is stored in a computer (e.g., computer 200 of FIG. 2) wherein a database management system (DBMS) may consult the database 300 to answer queries (e.g., to select data). Data retrieved in answer to queries become information that can be used to make decisions, may precipitate actions, or may be displayed to a customer service representative 110a-N.

For simplicity, database 300 is depicted and described in the embodiment of FIGS. 3a and 3b as a relational database. In the same or alternative embodiments, all or part of database 300 may configured according to another database model such as a hierarchical model, a table model, a network model, an object model, an associative model, etc.

Data shown in FIGS. 3a and 3b for database 300 can be arranged and represented in any suitable fashion. For example, organization chart 308 may be represented graphically as a tree, but may be implemented as a table 302b. For example, in a tabular implementation each node of the shown organization chart 308 tree may represent a customer service representative 110i and be implemented by a row, where a column of that row may be used to refer to another customer service representative 110k, where customer service representative 110k would be represented by a tree node above (e.g., a supervisor or other customer service representative 110i). As an example, customer service representative 110k with a CSR ID 330 (equivalently 306, 320 and 342) value of 1 may be a superior of a customer service representative 110i with a CSR ID 330 (306, 320, 342) value of 4, as shown in the tree representation of the organization chart 308. Tables 302a-d may be data tables as is known in the use of databases. It is understood that any number of tables and/or relational charts may be used to store and correlate data. Similarly, though depicted as tables, tables 302a-d are a visual representation of a database relation and any appropriate implementation of data storage and correlation may be used. As such, tables 302a-d, especially those related to organizational chart 308, may be an address book or a portion of an address book, and may be used by customer service representatives 110a-N. Such address books may be address books of the call center 102, address books of external organizations (e.g., address books associated with customers 104a-N, etc.), or any combination thereof. Other data that is not shown may be stored in conjunction with the data shown in FIGS. 3a and 3b. The exemplary data that is shown in FIG. 3a is used to identify a first customer service representative 110i (among the customer service representatives 110a-N), where the customer service representative 110i is responsible for handling the incoming message.

Tables 302a-d may be a set of data elements organized using rows and columns which may be accessed via the DBMS (e.g., as in a look-up table). The columns may be identified by title (e.g., "Incoming Source Information" and "Transaction ID") or another identifier. The rows may be identified by the values (e.g., "973-555-1111", "1", "3" hours, etc.) appearing in a particular column. In some embodiments rows may also have titles or other identifiers.

The list of incoming source information 304 may include data values associated with incoming messages to UM call center 102, such as those messages from customers 104a-N. That is, incoming source information 304 may be a list of telephone numbers and/or email addresses of users who have previously contacted UM call center 102 or have some other prior association with UM call center 102. Accordingly, when UM call center 102 receives a call from a particular known source, UM database 300 may be accessed to determine any appropriate associations (e.g., associations of a received message, based on its originator, with a particular customer service representative ID (CRS-ID 306), association of particular customer service representatives 110a-N using organizational chart 308, address book information, etc.).

As discussed similarly in related U.S. patent application Ser. No. 12/582,263, entitled "Message Routing in a Unified Messaging System", tables 302a-c may include other appropriate information such as information about each customer service representative 110a-N. Table 302a can be used to identify a specific customer service representative 110i using the incoming source information of an arrived message and the CSR ID 306 of that customer service representative 110i. For example, if a voice message is from a caller at number 973-555-3333, customer service representative 110i with CSR ID 306 with a value of 3 can be initially associated with that arrived message. As another example, UM platform 106 can associate an arrived email from particular_originator_1@hype1-abc-corp.com with a UM platform 106 subscriber customer service representative 110i with a CSR ID 306 with value of 5. Not all of the customer service representatives 110a-N of the call center 102 may be initially associated with incoming messages by UM 102. For example, only 5 customer service representatives are listed in table 302a, whereas information about more customer service representatives are stored in the example data for table 302b of call center 102. An incoming message, whose incoming source information is otherwise not specified in table 302a is associated with a customer service representative 110i, whose CSR ID 306 has a value of 4 for the example data that is shown. A message that is received into UM platform 106 from a customer 104a-N for a customer service representative 110a-N is referred to as an original message herein. Each original message is stored in the mailbox (also referred to as Inbox) of the appropriately-associated CSR.

Tables 302b and 302c may be related in a hierarchical structure in that table 302c may provide further information about table 302b.

In the exemplary embodiment of FIG. 3a, table 302b may represent an organizational chart 308. Such an organizational chart may be a representation of a partial or full hierarchical relationship of customer service representatives 110a-N in call center 102. For example, if a customer 104a-N associated with the incoming telephone number "973-555-1111" from the list of incoming source information 304 contacts UM call center 102, a customer service representative 110i with CSR ID 306 with a value of 1 can be initially associated with that arrived original message. The information in table 302c can be used by UM platform 106 to escalate handling of this message to other people (i.e., other call center employees with CSR IDs 330 (equivalently, 306, 320 and 342) of 2, 3 and 5), when certain conditions are met. That is, as discussed below with respect to FIGS. 4 and 5, messages deposited in mailboxes associated with the customer service representatives 110a-N designated in organizational chart 308 may be escalated to other customer service representatives 110a-N according to one or more predetermined conditions. In the sample organization chart 308 of table 302b, the CSR ID values 306 (320, 330) of employees are stored for each employee. The level of each employee may also be stored in table 302b. For example each row of a tabular arrangement of table 302b can include (among other data) a column value for level of that employee and another column for the CSR ID 306 (320, 330) of that employee. A total of 5 levels are shown for table 302b, where customer service representative with the CSR ID 306 (320, 330, 342) with value of 4 is at level 1, customer service representatives with CSR IDs 306 (320, 330, 342) with values of 1, 3 and 5 are at level 2, and so on. The customer service representative 110i with CSR ID 306 (320, 330, 342) with value of 10 is at level 5 in table 302b. There can be one or more levels in the organization of the call center 102.

Information related to the escalations of messages among customer service representatives 110a-N may be stored in table 302c. Table 302c may store information related to the length of time an escalation notification (message) about the original message or the original message itself is stored in a particular mailbox before one or more escalation notifications may be attempted. For example, a message stored in a mailbox for the customer service representative 110a-N with CSR ID 330 (306, 320, 342) with value of 4 may be stored for 0.5 hours in his/her mailbox without being retrieved, before an escalation notification about this message are sent to the next designated customer service representative(s) 110a-N (e.g., to the customer service representative 110a-N with the CSR ID 330 (306, 320, 342) with value 1 for the example data that is shown in table 302c). Similarly, as shown in table 302c, a message stored in a mailbox for a customer service representative with CSR ID 330 (306, 320, 342) with value 1 may be stored for 1 hour before being escalated to next designated customer service representatives 110a-N with CSR ID 330 (306, 320) values 2, 3 and 5. The CSRs that are sent escalation notification messages can be at different levels of the organization chart 308. In other words, different customer service representatives 110a-N may be assigned different durations (timing delays) where messages that are held in their mailboxes before such messages can be escalated to zero or more other customer service representatives 110a-N. The Escalation CSR IDs 334 list for the customer service representative 110m with the CSR ID 330 (306, 320, 342) with value of 5 does not represent a valid CSR ID 330 (306, 320, 342) value in the example of table 302 (where a special value of "–" is shown), indicating that messages for the customer service representative 110m are not to be escalated further. In at least one other alternative embodiment, or additionally, the Timing Delay 332 value for the customer service representative 110m with CSR ID 330 (306, 320) with value 5 may be set to a special value (such as –1) to indicate that UM platform 106 must not escalate handling of incoming messages for that customer service representative 110m with CSR ID 330 (306, 320, 342) with value of 5. In at least one embodiment, Escalation CSR ID 334 values for table 302c may be populated such that the same CSR may receive more than one escalation notifications for the same original message from a customer as described later for method 500. In at least one other embodiment, Escalation CSR ID 334 values are populated in table 302c in a non-circular fashion to ensure that no repetitive escalation notification message can be sent to the same CSR for a single original customer message as described later for method 500. In all cases, as described later with respect to method 500, UM platform 106 can stop transmissions of escalation notification messages. Table 302c can be populated with Escalation CSR ID 334 values such that escalations for a CSR 110i can be sent to other CSRs who may be at the same and/or other levels of the organization chart 308. For example, as shown in table 302c, escalation notifications for an original message for a CSR with CSR ID 330 with value of 1 can be sent to three other CSRs with CSR ID 334 values 2, 3 and 5, where such three CSRs are at the same and other levels of organization chart 308.

In at least one embodiment, only depositing of an original message in an Inbox may result in transmissions of escalation notification messages by the UM platform 106 (that is, only one set of notifications, corresponding to the entry values of only one cell of the Escalation CSR IDs 334 column) are transmitted for an original message. For example, if an original message is deposited into the Inbox of the CSR with the CSR ID 330 (306, 320, 342) with value 2, only three escalation notifications can be ever generated for that original message by the UM platform 106 to CSRs with CRS IDs 306 (320, 330), 342 with values 2, 3 and 5. In at least one other embodiment, UM platform 106 can also transmit one or more subsequent escalation notifications (as configured in table 302c) upon the expiry of the timing delay 332 after depositing of an escalation notification in an Inbox. In this alternative embodiment, sets of subsequent notifications can be sequences, where each stage in the escalation sequence follows its separate timing delay 332 for the mailbox of the mailbox of the corresponding CSR.

Another table 302d of UM database 300 can be used to maintain an acknowledgement flag 346 status and other data about each message that arrived from a customer 104a-N and original message with zero or more transaction IDs 312. For conciseness, only a few rows of data are shown in FIG. 3b, and additional rows can exist in table 302d. Each arrived message in a UM platform 106 is assigned a unique message UID 318 by UM platform 106. Value of a message UID 318 is unique to the mailbox of each customer service representative 110a-N, but message UID 318 values may be the same for different messages in different mailboxes of different customer service representatives 110a-N. Each row of table 302d can contain various pieces of information, including the example columns that are shown in FIG. 3b. At least one row exists in table 302d for each message for the Inbox (mailbox) of each customer service representative 110a-N. In the exemplary embodiment that is shown in FIG. 3b, data about all messages of all customer service representatives 110a-N are stored in a single table 302d. In at least one other embodiment, at least one separate instance of table 302d may be used for each customer service representative 110i to store information only about messages of that customer service representative 110i (the CSR ID 320 column would be implicit in that alternate embodiment).

The CSR ID 320 (306, 330, 342) identifies the Inbox of the particular CSR 110i who has received the message that is being described in that row of table 302d. For example, the first row corresponds to a message with message UID 318 of value 81 that is stored in the Inbox of CSR with CSR ID 320 (306, 330, 342) with value 1. The second row contains data for another message with Message UID 318 with value of 215 for the same CSR with CSR ID 320 (306, 330, 342) with value 1. The 6th row corresponds to a message with Message UID 318 of value 81 that is stored in the Inbox of CSR with CSR ID 320 (306, 330, 342) with value 3. The Original CSR ID 342 column indicates the original recipient customer service representative 110a-N of a message. For example, the first row for the CRS with CSR ID 320 (306, 330, 342) with value of 1 contains information about an original message with message UID 318 with value 81 that was received into the UM platform 106 for the CSR with the CSR ID 320 with value 1. The Transaction ID 312 can be used by customer service representatives 110a-N to associate useful (e.g., tracking) information with each original message as described later in steps 620 and 625 of method 600. Transaction ID 312 data is optional (that cell in the table can be empty), and is stored with original messages only (it is not stored with initial notification messages or with escalation notification messages). Customer Care Message Type 344 column can be used to distinguish among original (shown as "O") messages that have arrived for each customer service representative 110a-N, initial notification (identified with "IN") messages from the UM platform 106 about arrivals of original messages for customers 104a-N, escalation notifications (shown as "EN"), as well as other system messages as may be desired.

Initial notification messages may be sent by the UM platform 106 as described later in step 420 of method 400. For example, the message with message UID 318 with value 215 was sent by the UM platform 106 to the CSR with CSR ID 320 (306, 330) with value 1 to inform him/her that a new message (with message UID 318 having a value of 81) from a customer 104a-N was deposited into his/her mailbox by the UM platform 106. Contents of initial notification messages and escalation notification messages can include additional information about the corresponding original message. Example initial notification messages with Message UID 318 with values 19 and 82 for the CSR with CSR ID 320 (306, 330) value of 3 are shown in table 302d for completeness, and can correspond to the original messages with message UID 318 with values 18 and 81, respectively. However, initial notifications are typically sent to other destinations and/or accounts of customer service representatives 110a-N using any suitable communication schemes such as telephone calls to mobile devices, pager messages, emails to other accounts, Etc.

Escalation notification messages (escalation notifications) are used to bring attention to original messages, which have not been retrieved for handling. Sample escalation notification messages with message UID 318 with values 31 and 129 in table 302d indicate that two original messages having message UIDs 318 with values 27 and 81 for the CSR with CSR ID 320 (320, 330) with value 1 had been escalated to the CSR having the CSR ID 320 with value 3. In at least one embodiment, the UM platform 106 may delete escalation notifications from mailboxes of customer service representatives 110a-N, if the corresponding original message is deleted. In at least another embodiment, such escalation notifications may not be automatically deleted by the UM platform 106 (for example, an original message with message UID 318 with value of 27 for CSR with the original CSR ID 342 with value 1 has been deleted in the example table 302d).

The acknowledgement flag 346 of table 302d is used to keep track whether a customer service representative 110a-N has acknowledged retrieval and handling of the original message with the message UID 318 value indicated in that row. The acknowledgement flag 346 may indicate that a message has been retrieved (value "R") or not retrieved value ("NR"). The acknowledgement flag 346 is applicable only to original messages (with Customer Care Message Type 344 value of "O"). Customer service representatives 110a-N may associate each original message with zero or more transaction IDs 312. Transactions can be any information that may be maintained in the UM database 300 or another database (not shown) such as trouble tickets, invoices, or payments. Such transactions may be related to customers 104*a*-N or other events or information which may be internal to the call center 102. Table 302*d* may contain or otherwise refer to other data (not shown) such as message type (e.g., facsimile, voicemail, email), timestamp for message arrival, message priority, Etc. Other data in database 300 may be used to associate each CSR ID 306 (320, 330, 342) to the unique email address of each customer service representative 110*a*-N, as described in the co-pending and concurrently filed U.S. patent application Ser. No. 12/582,263, entitled "Message Routing in a Unified Messaging System". Each authorized customer service representative 110*a*-N can use the UM platform 106 to populate, modify, and/or delete one or more transaction IDs 312 for an original message, after he/she accesses each such message. Transaction ID 312 values are associated with only with Customer Care Message Type 344 values of type "O" (original customer messages), so as to associate such information with the original customer message. Such transaction IDs 312 may be used to communicate additional information about messages between customer service representatives 110*a*-N, who may have accessed such a message. For example, the data in table 302*d* indicates that the customer service representative 110*i* with CSR ID 320 (330, 306) of value 3 may have not accessed a message in his mailbox with message UID 318 of value 18 yet and/or has not assigned any transaction ID 312 values to it, whereas the message with message UID 318 with value 81 of mailbox of customer service representative 110*j* with CSR ID 320 (330, 306) value of 1 has assigned two transactions ID 312 with values of Z7918 and 3912AB.

Figure 4:
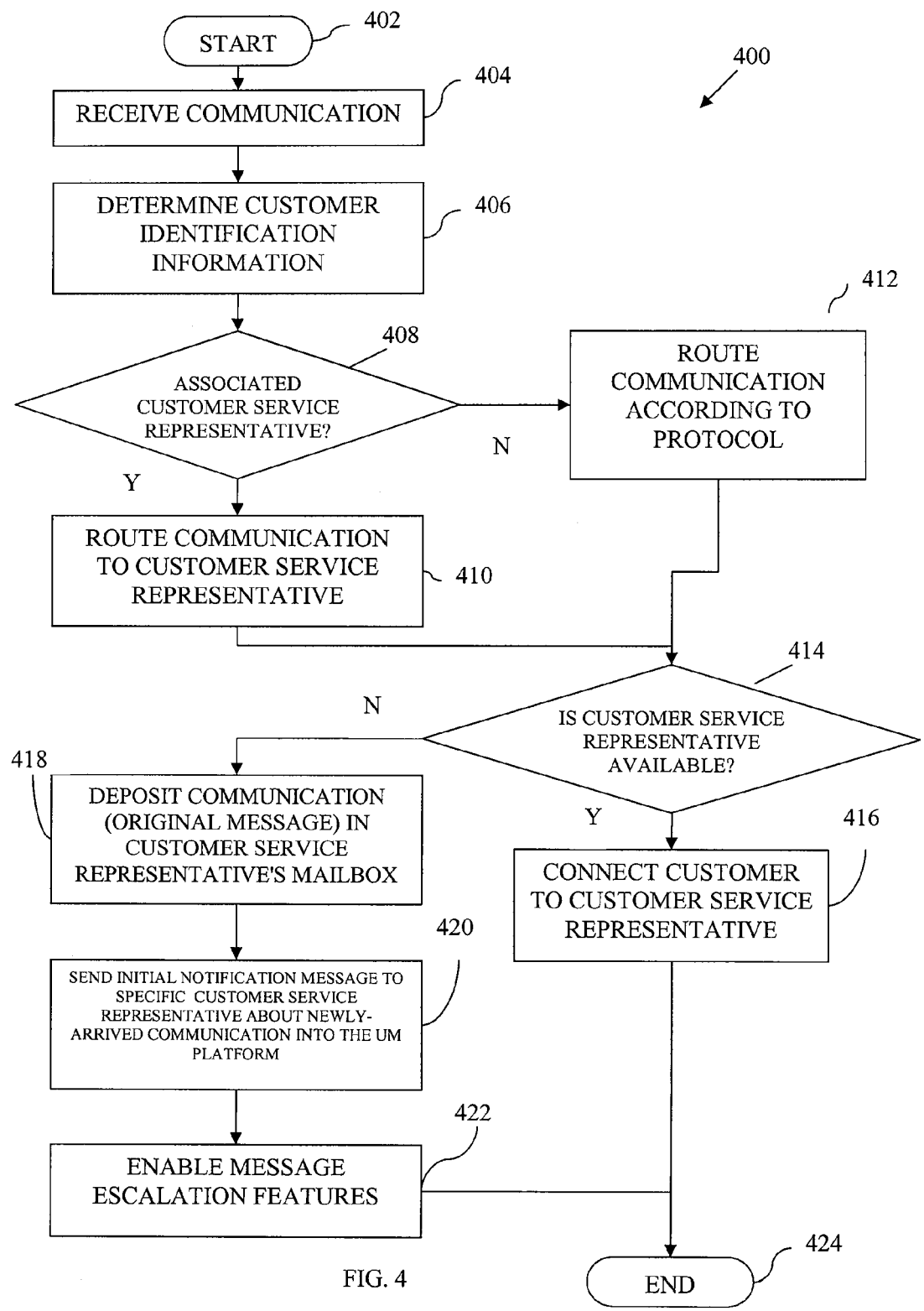
FIG. 4 is a flowchart of a method of message handling in a unified messaging system according to an embodiment of the disclosed technology.

FIG. 4 is a flowchart of a method 400 of message handling in a unified messaging system according to an embodiment of the present disclosure. The method 400 may be performed by components of UM call center 102 as discussed below. Specifically, UM controller 112 and/or UM interface 108 may be used to perform the steps of method 400 as appropriate. The method begins at step 402.

In step 404, a communication is received at call center 102. The communication may be a message, telephone call, email, facsimile, short message service (SMS) message, text message, or the like received from a customer 104*a*-N. In at least one embodiment, the communication is received at UM interface 108. In the same or alternative embodiments, the communication is received and handled further by UM controller 112.

In step 406, user (e.g., customer) identification information is determined. In at least one embodiment, customer identification information is determined by UM interface 108 and/or UM controller 112 based on the communication received in step 404. Customer identification information (e.g., a user identification designation) may be a telephone number, caller ID, email address, Internet Protocol (IP) address, or any other appropriate identifier. For example, the customer identification information may be an incoming source information 304 as shown in FIG. 3*a*. In some cases, no customer identification information can be determined; in these cases, the incoming communication may be identified as "OTHER", as shown in FIG. 3*a*. In an alternative embodiment, customer identification information may be information indicative of the reason the customer 104*a*-N has contacted UM call center 102.

In step 408, a determination is made as to whether a customer service representative 110*a*-N is associated with the incoming communication. As described above with respect to FIG. 3*a*, tables 302*a*-*d* of UM database 300 may be accessed (e.g., by UM controller 112) and a customer service representative 110*a*-N may be identified. In this way, a message recipient may be determined by querying one or more recipient databases and/or address books. In other words, UM database 114/300, which includes address book (e.g., contact) information for each customer service representative 110*a*-N, may be queried to determine which customer service representative 110*a*-N is to be associated with the incoming communication.

If a customer service representative 110*a*-N is determined in step 408, the method proceeds to step 410 and the communication is routed to that customer service representative. If no customer service representative 110*a*-N is identified in step 408, the method proceeds to step 412 and the communication is routed according to a predetermined protocol.

In step 410, the communication received in step 404 is associated with and routed to the UM platform 106 mailbox of a customer service representative 110*a*-N. That is, a lookup or other function is used to query an address book, a database, or the like to determine if the originator (sender) of the message has been associated with (e.g., assigned to, etc.) a customer service representative and the communication is sent to the mailbox of that customer service representative. The method then proceeds to step 414.

In at least one embodiment, the query accesses a hierarchical or organizational chart, such as organizational chart 308 of table 302*b* in FIG. 3*a*, to determine the associated customer service representative 110*a*-N. In the example of FIG. 3*a*, the communication associated with a caller from 973-555-333 is routed to the customer service representative 110*a*-N with CSR ID 306 (320, 330) with value of 3.

If no customer service representative 110*a*-N is identified in step 408, the communication is routed according to a predetermined protocol in step 412. In at least one exemplary embodiment of a predetermined protocol, which can be used when the <<OTHER>> record in table 302*a* may be missing or otherwise unavailable, UM platform 106 sends the message to any of the customer service representatives 110*a*-N who may be identified with CSR ID values 306 in table 302*a*. In yet another embodiment, the communication is assigned to a customer service representative 110*a*-N according to a predetermined schedule (e.g., next available, lowest workload, position on organizational chart 308, etc.) and the communication is routed to the identified customer service representative 110*a*-N. The method then proceeds to step 414.

In step 414, a determination is made by one or more communication equipment components such as a telephone network switch (not shown) as to whether the designated customer service representative 110*a*-N is available. Here, available refers to an ability to communicate with the customer 104*a*-N in a live or practically live format such as a telephone call, video call, or the like. In at least another embodiment, the UM platform 106 may try to dial out a different phone for the target customer service representative 110*i*, if the incoming message is a live telephone call. If the customer service representative 110*a*-N is available, the method proceeds to step 416 and the customer 104*a*-N associated with the incoming communication is connected to the customer service representative 110*i*. In at least one embodiment, where the live communications is not established (e.g., for emails and facsimiles), UM platform 106 allows the customer 104*a*-N to deposit an original message into mailbox of the customer service representative 110*a*-N, as appropriate.

If the customer service representative 110*a*-N is not available, the method proceeds to step 418 and the communication is deposited in a mailbox of the customer service representative 110*a*-N as an original message (with Customer Care Message Type 344 value of "O"). An acknowledgment flag 346 is associated with each such newly arrived and deposited original message, and the initial value of such flag is set to "Not Retrieved" (also referred to as "false"), indicating that this particular communication has not been attended to and is not being handled by any customer service representative 110a-N. In at least one embodiment, the communication is deposited in a mailbox at UM interface 108 that is specifically assigned to the customer service representative determined in step 408 instead of a general (e.g., communal) mailbox. After deposition of the communication, the particular identified customer service representative 110a-N can be notified of the communication in step 420. An initial notification message may be sent by any appropriate means, such as a page, telephone call, email, email alert, SMS message, voicemail, or the like. In at least one embodiment, this initial notification would include information indicative of the customer identified in step 406, and may also include the message UID 318. In this way, the customer service representative 110a-N responsible for a particular customer 104a-N is notified that the customer has left a message. This is an initial notification message about arrival of a new original message from a customer 104a-N who is associated with a particular customer service representative 110a-N, as opposed to an escalation notification message that will be described later in connection with step 514 of method 500 with regards to a message that had previously arrived into a UM platform 106 and was originally associated with possibly a different customer service representative 110a-N.

Following notification in step 420, message notification escalation features are enabled in step 422. These message escalation features are discussed further with respect to method 500 of FIG. 5.

Figure 5:
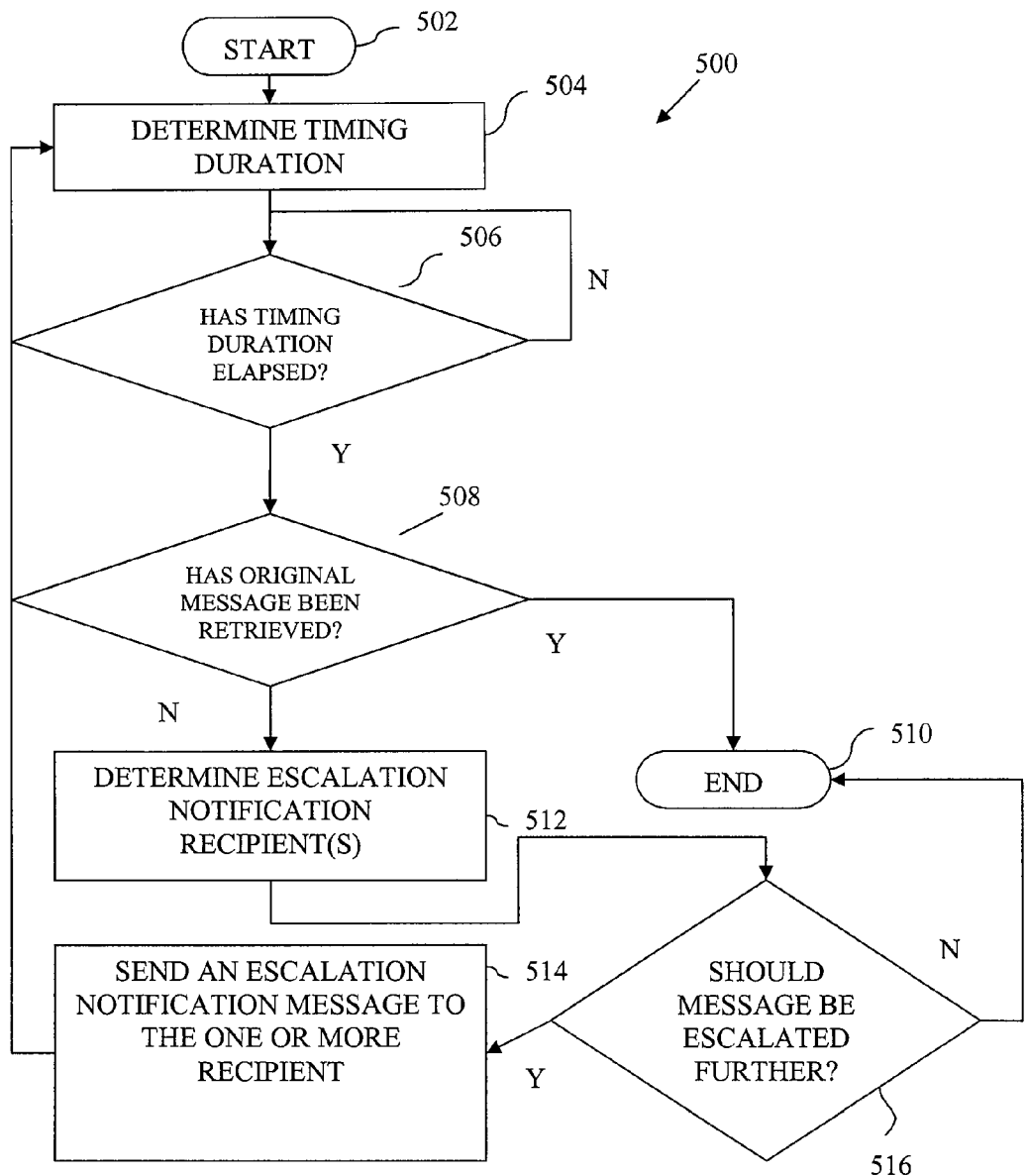
FIG. 5 is a flowchart of a method of message escalation in a unified messaging system according to an embodiment of the disclosed technology FIG. 6. is a flow chart of a method of associating received messages with transaction IDs in a unified messaging system according to an embodiment of the disclosed technology.

FIG. 5 is a flowchart of a method 500 of message notification escalation in a unified messaging system according to an embodiment of the present disclosure. The method 500 may be performed by components of UM platform 106 as discussed below. Specifically, UM controller 112 and/or UM interface 108 may be used to access UM database 114/300 to perform the steps of method 500 as appropriate. For conciseness of description, the method begins at step 502 and it is assumed that an original message has been or will be deposited in a mailbox associated with a customer service representative 110a-N as described above with respect to FIG. 4 for a newly arrived message into UM platform 106 or an escalation notification message has been deposited into the mailbox of a customer service representative 110a-N as described later for step 514 of method 500 of FIG. 5. As described earlier, an escalation notification message may be generated by UM platform 106 as a consequence of not only an original message, but also as a consequence of a prior escalation notification message, depending on the embodiment.

In step 504, a timing duration (delay) is determined. Specifically, the timing duration (delay) may be looked up from a database (e.g., table 302c of UM database 300) or other location (e.g., UM controller 112, UM interface 108, etc.). The timing duration is a time that the deposited original message (or an escalation notification message about a deposited original message) is stored (e.g., held) at a mailbox before an automatic action (e.g., escalation) is triggered. That is, the deposited original message or escalation notification message is associated with a time period before UM interface 108 intervenes. As discussed above, and as shown in table 302c, the timing duration may be associated with the mailbox of the customer service representative 110a-N.

In step 506, a determination is made as to whether the timing duration has elapsed. In at least one embodiment, a timer is activated and run for the timing duration determined in step 504. The timer counts down the timing duration determined in step 504. In at least one embodiment, the timer is activated when the original message from a customer 104a-N or an escalation notification message is deposited in a mailbox. The timer may be a separate component of UM platform 106, may be a part of UM interface 108, may be implemented as logic by UM controller 112, or may be implemented through another method. The determination is continually made until the timing duration has elapsed. The method then proceeds to step 508.

In step 508, a determination is made as to whether the subject original message has been retrieved by a customer service representative 110a-N. This determination is made based on an acknowledgement flag 346 that is associated with the original message as shown in table 302d. The status of the acknowledgement flag 346 indicates whether or not the message has been retrieved. If the message has been retrieved, the method proceeds to step 510 and the method ends.

If the message has not been retrieved, the method proceeds to step 512 and zero or more other customer service representatives 110a-N is(are) determined for escalation notifications. The other customer service representative(s) 110-N is (are) determined according to a predetermined structure, or other escalation parameters. In at least one embodiment, the new message recipient is determined based on information that has been configured in table 302c. The method then proceeds to step 516.

In step 516, a decision is made, based on the determined results of step 512, whether further escalation of the message is necessary. If no escalation CSR IDs 334 are found for that customer service representative 110a-N and/or a predetermined timing value (such as −1) is observed in step 512, no further escalations are indicated, and the method proceeds to end at step 510. Otherwise, the method proceeds to step 514. Alternatively, escalation may occur because of some other reason, e.g., it is known that the identified customer service representative will not be available within an acceptable period of time.

In step 514, an escalation notification message is sent to each recipient that was identified in step 512. Each escalation notification message is not simply a copy of the original message. In at least one embodiment, each escalation notification message includes some of the information associated with the originally-arrived message (e.g., incoming telephone number, importance, original CSR ID 342, original message UID 346, etc.) and/or be enhanced with additional information (e.g., time elapsed since original message deposit, customer information, etc.). Furthermore, each escalation notification message can include hyperlinks as used in the Hypertext Transport Markup Language (HTML) links, where activations of such links by each CSR recipient would cause the UM interface 108 and/or UM controller 112 to affect the acknowledgement flag 346 and possibly other data associated with the status of the originally arrived message. Examples of actions associated with such hyperlinks include, but are not necessarily limited to: "I Will Handle This Customer Message" and "I Can Not Handle This Customer Message". An "I Will Handle This Customer Message" action invocation by a customer service representative 110a-N can set the acknowledgement flag 346 associated with the original message to "Retrieved" (also referred to as "R" and "True"). An "I Can Not Handle This Customer Message" action invocation by a customer service representative 110a-N can set the acknowledgement flag 346 associated with the original message to "Not Retrieved" (also, referred to as "N" and "False"). The original customer service representative 110a-N who receives an original message can also use UM interface 108 and/or UM controller 112 to change the value of the acknowledgement flag 346. In at least one embodiment, the UM platform 106 can re-invoke method 500 to re-trigger escalations, if a customer service representative 110*a*-N changes the acknowledgement status 346 to "Not Retrieved". The acknowledgment flag 346 is used in step 508 of method 500: Database 300 may contain additional data (not shown) to maintain an audit trail of such status changes for each message, and such audit trail can include CSR Ds 320 (306, 330, 342) of each customer service representative 110*a*-N whose actions affected the state of the acknowledgement flag 346. An illustrative form for a sample hyperlink that may appear within escalated notification messages may be of the form http://<address of the UM interface 108 or UM controller 112>?action=<any_action>&original_recipient_csr_id= <CSR ID 342>&msg_uid_of original_recipient=<Message UID 348>&csr_id_of_invoker=<CSR ID 320>&trans_id=<transaction_id 312>. Angled brackets are used to denote the intent of an item in the example hyperlink form syntax. The <any_action>parameter can be (among other possibilities), for example, "r" for retrieve (which may implicitly also result in setting the acknowledgement flag 346 to "True"), "h" for "I Will Handle This Customer Message" as described earlier, and "n" for "I Can Not Handle This Customer Message" as described earlier, "atid" for "add transaction ID", "dtid" for "delete transaction ID", Etc. In at least one embodiment, a change to the transaction ID 342 property of an original message also implicitly results in changing the value of the acknowledgement flag 346. In at least one other embodiment, any change to the value of the acknowledgement flag 346 must be the result of an explicit action by a customer service representative 110*a*-N or other authorized personnel (not shown) of call center 102. An example hyperlink may be http://192.168.0.76?action= r&original_recipient_csr_id=1&msg_uid_of_original_ recipient=81&csr_id_of_invoker=3&trans_id=0. Operations on transaction IDs 312 will be described using method 600 and FIG. 6. Any customer service representative 110*i* may manipulate the status of an original message that he/she initially received from a customer 104*a*-N. In one embodiment, UM platform 106 authorizations for changing the values of transaction ID 312 and acknowledgement flag 346 for an original message of CSR 110*i* by other CSRs (customer service representatives 110*a*-N other than the originally-assigned customer service representative 110*i*) may be implicit (that is, any CSR 110*a*-N would be authorized by the UM platform 106 to change such information). In another embodiment, UM platform 106 authorizations for changing the values of transaction ID 312 and acknowledgement flag 346 for an original message of CSR 110*i* by other CSRs (customer service representatives 110*a*-N other than the originally-assigned customer service representative 110*i*) may be limited such that only the CSRs whose Escalation CSR IDs 334 (306, 320, 330) are configured in one or more of the rows of table 302*c* may change such information. Benefits of escalation messages that are disclosed herein include the facts that only one copy of the originally-received communication (original message) can be maintained in the UM platform 106, the fact that copies of that original message not need to be propagated to other customer service representatives 110*a*-N or otherwise maintained, the fact that simple status changes to original messages can be made by authorized customer service representatives 110*a*-N using escalated notification messages with action hyperlinks, and that fact the status of each originally-received message is maintained by using a simple global acknowledgement flag 346 that can be manipulated by targeted authorized customer service representatives.

The method then returns to step 504 and a new timing duration is determined. As discussed above, each customer service representative 108*a*-N may have a different associated timing duration stored in database 300.

In some embodiments, after determining that a message has not been retrieved in step 508, UM interface 108 or UM controller 110 may access a calendar of any or all of the message recipient(s) to determine if the message recipient(s) should be available, is(are) away, is(are) on vacation, etc. In this way, the UM platform 106 may determine if further escalation is required. In some embodiments, the timing duration may be reset or modified based on such calendar information. The system will continue to check on the status of the original message until the original message is marked retrieved or the escalation parameters reach the highest escalation contact as defined in the escalation parameters.

Figure 6:
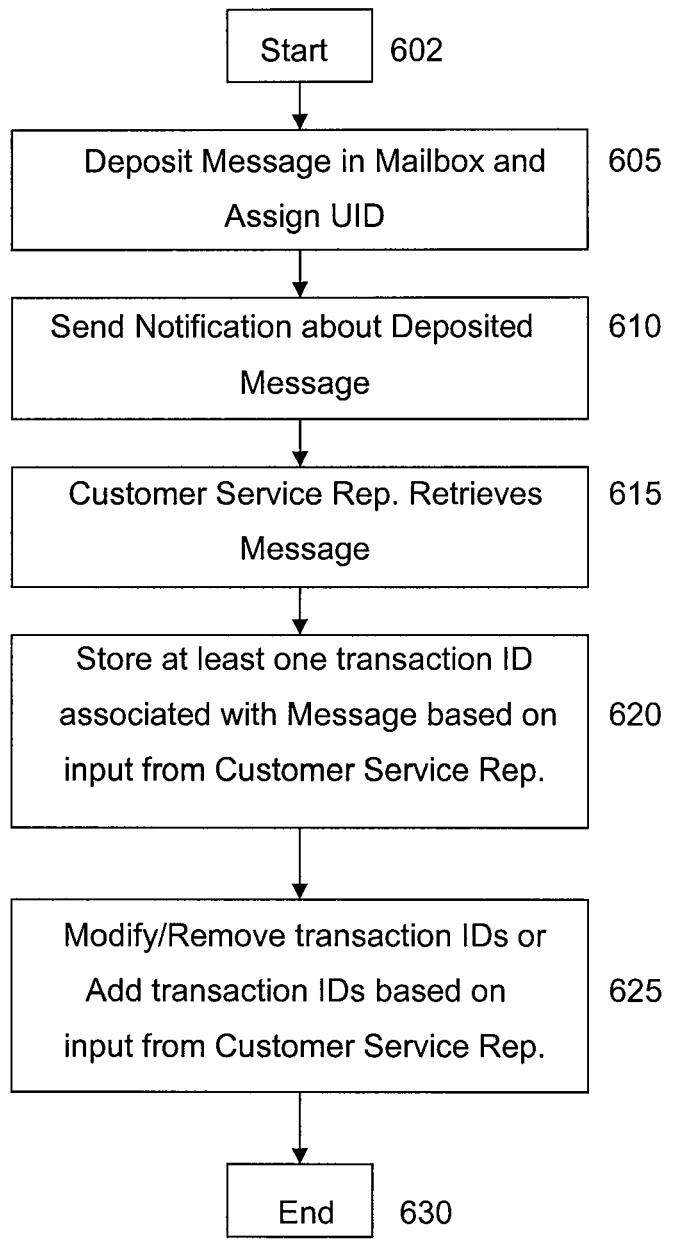

As described above, a customer service representative 110*a*-N may assign zero or more transaction IDs 312 to an original message. FIG. 6 is a flowchart illustrating a method 600 of assigning transaction IDs 312 to an original message according to an embodiment of the present disclosure. For example, the method 600 of FIG. 6 enables a customer service representative 110*k* to assign at least one transaction ID 312 to a message in the mailbox of the customer service representative 110*a*-N and modify or remove any transaction IDs 312 assigned to an original message. The method 600 begins at step 602. In step 605, UM platform 106 deposits an original message in the mailbox (e.g., as described in step 418 of method 400), and assigns a unique message UID 318 to this new message in that mailbox. The UM platform 106 selects which mailboxes to send original messages, initial notification messages and escalation notification message as described above in methods 400 and 500. In step 610, UM platform 106 sends at least one initial notification and/or escalation notification message about the deposited original message to one or more customer service representatives 110*a*-N. This notification step is described above in step 420 of method 400 and step 514 of method 500. In step 615, in response to receiving the notification about the deposited message, a customer service representative 110*k* retrieves the message from the mail box. This sets the status acknowledgment flag 346 to "Retrieved". This acknowledgement flag 346 is read in step 508 of method 500. In step 620, optionally, at least one transaction ID 312 is associated with the message and stored in database 300 based on input received from the customer service representative 110*k*. This allows the customer service representative 110*k* to assign one or more transaction IDs 312 to the original message. In step 625, existing transaction IDs 312 associated with the original message are modified or removed or new transaction IDs 312 associated with the original message are added based on input received from the customer service representative 110*k*. This allows the customer service representative 110*k* to modify or remove any existing transaction ID 312 or assign a new transaction ID 312 to an original message. The customer service representative 110*p* who originally received the original message can use the UM controller 106 to assign, remover, or modify zero or more transaction IDs 312 to an original message. The method 600 ends at step 630. It is to be understood that method 600 of FIG. 6 allows an authorized customer service representative 110*k* to specify or modify transaction IDs 312 associated with a message in the mailbox of the customer service representative 110*p* at any time. Any customer service representative 110*p* may manipulate transaction ID 312 values for the messages that he/she initially received from a customer 104a-N. Authorizations for customer service representatives 110a-N other than the originally-assigned customer service representative 110p may be implicit or may be enforced by the UM platform 106 using that Escalation CSR IDs 334 that can be configured in table 302c of database 300, as described earlier.

Though discussed herein as being related to a call center and customer service representatives, one of skill in the art would recognize that the methods and systems described herein could be extended to any appropriate organizational structure. That is, the escalation methods of FIGS. 4 and 5 and the method of FIG. 6 for assigning transaction IDs to a message could be used in any firm, company, network, or the like. In such cases, customer service representatives would be any internal users of the system and the call center would be any network or calling system used by the organization.

The foregoing Detailed Description is to be understood as being in every respect illustrative and exemplary, but not restrictive, and the scope of the general inventive concept disclosed herein is not to be determined from the Detailed Description, but rather from the claims as interpreted according to the full breadth permitted by the patent laws. It is to be understood that the embodiments shown and described herein are only illustrative of the principles of the present general inventive concept and that various modifications may be implemented by those skilled in the art without departing from the scope and spirit of the general inventive concept. Those skilled in the art could implement various other feature combinations without departing from the scope and spirit of the general inventive concept.

The invention claimed is:

1. A method for message handling in a unified messaging system comprising:
   determining whether a message stored in a mailbox of a first recipient has been retrieved by the first recipient after a time period associated with the mailbox of the first recipient, wherein the first recipient is associated with a first level of an organizational chart; and
   in response to determining that the message has not been retrieved by the first recipient after the time period associated with the mailbox of the first recipient;
   identifying recipients, other than the first recipient, associated with levels of the organizational chart other than the first level of the organizational chart; and
   delivering associated escalation messages to identified recipients.

2. The method of claim 1, further comprising:
   determining the first recipient from a plurality of recipients based on user identification information identifying a sender of an incoming communication; and
   delivering the message to the mailbox of the first recipient.

3. The method of claim 1, further comprising:
   determining a message routing escalation structure for each of a plurality of mailboxes in the unified messaging system; and
   storing the message routing escalation structure determined for each of the plurality of mailboxes in a database.

4. The method of claim 1, wherein identifying recipients comprises retrieving stored message routing escalation structure associated with the mailbox of the first recipient.

5. The method of claim 1, wherein identifying recipients is for escalation of the message based on a configured escalation structure associated with the mailbox of the first recipient.

6. The method of claim 5, wherein the configured escalation structure is determined based on selected configured elements of the organizational chart.

7. The method of claim 5, wherein the configured escalation structure comprises a list of identified recipients for escalation of messages stored in the mailbox of the first recipient.

8. An apparatus for message handling in a unified messaging system comprising:
   a processor; and
   a memory to store computer program instructions, the computer program instructions when executed on the processor cause the processor to perform operations comprising:
      determining whether a message stored in a mailbox of a first recipient has been retrieved by the first recipient after a time period associated with the mailbox of the first recipient, wherein the first recipient is associated with a first level of an organizational chart; and
      in response to determining that the message has not been retrieved by the first recipient after the time period associated with the mailbox of the first recipient:
         identifying recipients, other than the first recipient, associated with levels of the organizational chart other than the first level of the organizational chart; and
         delivering associated escalation messages to identified recipients.

9. The apparatus of claim 8, the operations further comprising:
   determining the first recipient from a plurality of recipients based on user identification information identifying a sender of an incoming communication; and
   delivering the message to the mailbox of the first recipient.

10. The apparatus of claim 8, the operations further comprising:
    determining a message routing escalation structure for each of a plurality of mailboxes in the unified messaging system; and
    storing the message routing escalation structure determined for each of the plurality of mailboxes in a database.

11. The apparatus of claim 8, wherein identifying recipients comprises retrieving stored message routing escalation structure associated with the mailbox of the first recipient.

12. The apparatus of claim 8, wherein identifying recipients is for escalation of the message based on a configured escalation structure associated with the mailbox of the first recipient.

13. The apparatus of claim 12, wherein the configured escalation structure is determined based on selected configured elements of the organizational chart.

14. The apparatus of claim 12, wherein the configured escalation structure comprises a list of identified recipients for escalation of messages stored in the mailbox of the first recipient.

15. A non-transitory computer readable medium storing computer executable instructions for message handling in a unified messaging system, which, when executed on a processor cause the processor to perform operations comprising:
    determining whether a message stored in a mailbox of a first recipient has been retrieved by the first recipient after a time period associated with the mailbox of the first recipient, wherein the first recipient is associated with a first level of an organizational chart; and in response to determining that the message has not been retrieved by the first recipient after the time period associated with the mailbox of the first recipient:
    identifying recipients, other than the first recipient, associated with levels of the organizational chart other than the first level of the organizational chart; and
    delivering associated escalation messages to identified recipients.

16. The non-transitory computer readable medium of claim 15, the operations further comprising:
    determining the first recipient from a plurality of recipients based on user identification information identifying a sender of an incoming communication; and
    delivering the message to the mailbox of the first recipient.

17. The non-transitory computer readable medium of claim 15, the operations further comprising:
    determining a message routing escalation structure for each of a plurality of mailboxes in the unified messaging system; and
    storing the message routing escalation structure determined for each of the plurality of mailboxes in a database.

18. The non-transitory computer readable medium of claim 15, wherein identifying recipients comprises retrieving stored message routing escalation structure associated with the mailbox of the first recipient.

19. The non-transitory computer readable medium of claim 15, wherein identifying recipients is for escalation of the message based on a configured escalation structure associated with the mailbox of the first recipient.

20. The non-transitory computer readable medium of claim 19, wherein:
    the configured escalation structure is determined based on selected configured elements of the organizational chart; and
    the configured escalation structure comprises a list of identified recipients for escalation of messages stored in the mailbox of the first recipient.

* * * * *